(12) United States Patent
Liao

(10) Patent No.: US 10,936,033 B2
(45) Date of Patent: Mar. 2, 2021

(54) HOT PLUG MODULE POWER SUPPLY DEVICE, METHOD AND SYSTEM

(71) Applicant: ZHENGZHOU YUNHAI INFORMATION TECHNOLOGY CO., LTD., Henan (CN)

(72) Inventor: MingChao Liao, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 211 days.

(21) Appl. No.: 16/096,891

(22) PCT Filed: Sep. 7, 2017

(86) PCT No.: PCT/CN2017/100846
§ 371 (c)(1),
(2) Date: Oct. 26, 2018

(87) PCT Pub. No.: WO2018/129941
PCT Pub. Date: Jul. 19, 2018

(65) Prior Publication Data
US 2019/0138071 A1    May 9, 2019

(30) Foreign Application Priority Data
Jan. 16, 2017  (CN) .......................... 201710029227.2

(51) Int. Cl.
*G06F 1/26* (2006.01)
*H02H 3/08* (2006.01)
(Continued)

(52) U.S. Cl.
CPC .............. *G06F 1/266* (2013.01); *G06F 13/20* (2013.01); *G06F 13/4081* (2013.01);
(Continued)

(58) Field of Classification Search
CPC ............ H02H 3/08; H02H 3/087; H02H 3/10; H02H 9/001; H02H 9/004; G06F 13/20;
(Continued)

(56) References Cited

U.S. PATENT DOCUMENTS 6,717,784 B2 * 4/2004 Isago ..................... H02H 9/001
361/58
8,278,997 B1 * 10/2012 Kim ......................... G06F 1/26
327/541
(Continued)

FOREIGN PATENT DOCUMENTS

| CN | 102820638 A | 12/2012 |
|---|---|---|
| CN | 104427679 A | 3/2015 |
| CN | 106774772 A | 5/2017 |

OTHER PUBLICATIONS

International Search Report for PCT/CN2017/100846 dated Nov. 29, 2017, ISA/CN.

*Primary Examiner* — Jared Fureman
*Assistant Examiner* — Christopher J Clark
(74) *Attorney, Agent, or Firm* — Yue (Robert) Xu; Apex Attorneys at Law, LLP

(57) ABSTRACT

A hot plugging module power supply device, method and system are provided. When a hot plugging module is connected to a system in a hot plugging manner, a control unit transmits a first control signal to a signal processing unit. The signal processing unit forms a switch-on signal and transmits the switch-on signal to a switch unit, to gradually switch on the switch unit, to provide power to the hot plugging module. During the hot plugging module is supplied with power, when an overcurrent fault occurs in the hot plugging module, the control unit transmits a second control signal to the signal processing unit, and the signal processing unit forms a switch-off signal and transmits the switch-off signal to the switch unit, to immediately switch off the
(Continued)

switch unit, to stop supplying power to the hot plugging module.

14 Claims, 6 Drawing Sheets

(51) Int. Cl.
*G06F 13/40* (2006.01)
*H02H 3/087* (2006.01)
*H02H 9/00* (2006.01)
*G06F 13/20* (2006.01)
*H02H 3/05* (2006.01)

(52) U.S. Cl.
CPC ............... *H02H 3/05* (2013.01); *H02H 3/08* (2013.01); *H02H 3/087* (2013.01); *H02H 9/004* (2013.01)

(58) Field of Classification Search
CPC ........ G06F 13/4081; G06F 1/266; G06F 1/26; G06F 1/28; G06F 1/30; G06F 1/305
See application file for complete search history.

(56) References Cited

U.S. PATENT DOCUMENTS

| | | | |
|---|---|---|---|
| 2004/0070908 A1* | 4/2004 | Corcoran | ............... H02H 9/004 361/93.1 |
| 2004/0201936 A1 | 10/2004 | Ju | |
| 2016/0056141 A1* | 2/2016 | Dickey | .................. H02H 3/08 361/91.5 |
| 2016/0205731 A1 | 7/2016 | Zhang | |

* cited by examiner

HOT PLUG MODULE POWER SUPPLY DEVICE, METHOD AND SYSTEM

This application is the national phase of International Patent Application No. PCT/CN2017/100846, titled "HOT PLUG MODULE POWER SUPPLY DEVICE, METHOD AND SYSTEM", filed on Sep. 7, 2017, which claims the priority to Chinese Patent Application No. 201710029227.2, titled "HOT PLUG MODULE POWER SUPPLY DEVICE, METHOD AND SYSTEM", filed on Jan. 16, 2017 with the Chinese Patent Office, both of which are incorporated herein by reference in their entireties.

FIELD

The present disclosure relates to the technical field of computers, and in particular to a hot plugging module power supply device, a hot plugging module power supply method and a hot plugging module power supply system.

BACKGROUND

A hot plugging function is commonly used for a server. For some modules with the hot plugging function, users are allowed to remove or replace the modules, such as a hard disk, a power supply and various board cards without shutting off a system or cutting off a power supply. With the hot plugging function, the capability of timely recovering from a fault and the scalability and flexibility of the server can be improved, thereby improving the usability of the server.

When a hot plugging module with the hot plugging function is connected to an interface in a hot plugging manner, a large surge current may be generated due to instantaneous charge to a capacitive element, such as a capacitor, of the hot plugging module, thereby resulting in abnormal power supply to the hot plugging module, thus affecting a normal operation of the hot plugging module.

At present, a time delay circuit is arranged in a power supply circuit of the hot plugging module. A switch-on time of a power supply circuit may be extended due to the time delay circuit, thereby reducing a surge current generated in the hot plugging module during a hot connection.

In the conventional method for solving a problem of the large surge current generated in the hot plugging module, the surge current generated in the hot plugging module may be reduced through the time delay circuit. However, in a case where an overcurrent fault or a short circuit fault occurs in the hot plugging module, the power supply circuit of the power supply module is not cut-off timely due to the time delay caused by the time delay circuit, thereby resulting in a problem that the hot plugging module or the power supply circuit is damaged. Therefore, an insufficient security is achieved with the conventional method for supplying power to the hot plugging module.

Technical Problem

A hot plugging module power supply device, a hot plugging module power supply method and a hot plugging module power supply system are provided according to the embodiments of the present disclosure, to improve the security of the power supply to a hot plugging module.

Solution to the Problem

Technical Solution

A hot plugging module power supply device is provided according to an embodiment of the present disclosure, which includes: a control unit, a signal processing unit and a switch unit.

The switch unit is provided with a current input terminal, a current output terminal and a control terminal. The current input terminal is connected to an external power supply. The current output terminal is connected to an external hot plugging module. The control terminal is connected to the signal processing unit.

The control unit is configured to transmit a first control signal to the signal processing unit in a case where the hot plugging module is connected to a system in a hot plugging manner; and transmit a second control signal to the signal processing unit in a case where an overcurrent fault occurs in the hot plugging module.

The signal processing unit is configured to transmit, after receiving the first control signal transmitted by the control unit, a switch-on signal to the control terminal of the switch unit, to gradually switch on a current input terminal and a current output terminal of the switch unit; and transmit, after receiving the second control signal transmitted by the control unit, a switch-off signal to the control terminal of the switch unit, to immediately switch off the current input terminal and the current output terminal of the switch unit.

In an embodiment of the present disclosure, the switch unit includes at least one NMOS transistor. A drain of each of the at least one NMOS transistor is connected to the power supply, a source of each of the at least one NMOS transistor is connected to the hot plugging module, and a gate of each of the at least one NMOS transistor is connected to the signal processing unit. Each of the at least one NMOS transistor is configured to be gradually switched on after receiving the switch-on signal and be immediately switched off after receiving the switch-off signal.

In an embodiment of the present disclosure, the switch unit further includes at least one first resistor. The at least one first resistor is in one-to-one correspondence with the at least one NMOS transistor. A first terminal of each of the at least one first resistor is connected to a gate of a NMOS transistor corresponding to the first resistor, and a second terminal of each of the at least one first resistor is connected to the signal processing unit.

In an embodiment of the present disclosure, the signal processing unit includes: a second resistor, a capacitor, a diode and a transistor. A first terminal of the second resistor is connected to the control unit and the second terminal of each of the at least one first resistor, and a second terminal of the second resistor is connected to a base of the transistor. A collector and an emitter of the transistor are respectively connected to two terminals of the capacitor. The two terminals of the capacitor are respectively connected to a negative electrode of the diode and a ground wire. A positive electrode of the diode is connected to the first terminal of the second resistor. The transistor is configured to be switched off after receiving the first control signal with a high level, to charge the capacitor, to form a switch-on signal gradually increased from zero to the first control signal, and transmit the formed switch-on signal to the gate of each of the at least one NMOS transistor; and be switched on after receiving the second control signal with a low level, to discharge the capacitor, to directly transmit the second control signal to the gate of each of the at least one NMOS transistor as the switch-off signal.

In an embodiment of the present disclosure, the transistor includes: a PNP transistor or a NPN transistor. In a case where the transistor is the PNP transistor, an emitter of the PNP transistor is connected to a first terminal of the capacitor, a collector of the PNP transistor is connected to a second terminal of the capacitor, the first terminal of the capacitor is connected to the negative electrode of the diode, and the second terminal of the capacitor is grounded. In a case where the transistor is the NPN transistor, an emitter of the NPN transistor is connected to the second terminal of the capacitor, and a collector of the NPN transistor is connected to the first terminal of the capacitor, the first terminal of the capacitor is connected to the negative electrode of the diode, and the second terminal of the capacitor is grounded.

In the embodiment of the present disclosure, a hot plugging module power supply method based on the hot plugging module power supply device according to any one of the above embodiments is further provided according to an embodiment of the present disclosure, which includes:

determining, by the control unit, whether the hot plugging module is connected to a system in a hot plugging manner, and transmitting, by the control unit, a first control signal to the signal processing unit in a case where the hot plugging module is connected to the system in the hot plugging manner;

receiving the first control signal by the signal processing unit, and transmitting a switch-on signal to the control terminal of the switch unit by the signal processing unit after receiving the first control signal, to gradually switch on a current input terminal and a current output terminal of the switch unit, to supply power to the hot plugging module;

determining, by the control unit, whether an overcurrent fault occurs in the hot plugging module, and transmitting, by the control unit, a second control signal to the signal processing unit in a case where the overcurrent fault occurs in the hot plugging module; and receiving the second control signal by the signal processing unit, and transmitting a switch-off signal to the control terminal of the switch unit by the signal processing unit after receiving the second control signal, to immediately switch off the current input terminal and the current output terminal of the switch unit, to stop supplying power to the hot plugging module.

In an embodiment of the present disclosure, in a case where the switch unit includes at least one NMOS transistor, the gradually switching on the current input terminal and the current output terminal of the switch unit includes: gradually switching on each of the at least one NMOS transistor, and the immediately switching off the current input terminal and the current output terminal of the switch unit includes: immediately switching off each of the at least one NMOS transistor.

In an embodiment of the present disclosure, in a case where the switch unit further includes at least one first resistor, and the signal processing unit includes a second resistor, a capacitor, a diode and a transistor, the receiving the first control signal by the signal processing unit and transmitting the switch-on signal to the control terminal of the switch unit by the signal processing unit after receiving the first control signal includes:

receiving the first control signal with a high level by the transistor, where the transistor is switched off after receiving the first control signal, to charge the capacitor, to form a switch-on signal gradually increased from zero to the first control signal; and transmitting, by the transistor, the formed switch-on signal to the gate of each of the at least one NMOS transistor, the receiving the second control signal by the signal processing unit, and transmitting the switch-off signal to the control terminal of the switch unit by the signal processing unit after receiving the second control signal includes:

receiving the second control signal with a low level by the transistor, where the transistor is switched off after receiving the second control signal, to discharge the capacitor, to directly transmit the second control signal to the gate of each of the at least one NMOS transistor as the switch-off signal.

A hot plugging module power supply system is further provided according to an embodiment of the present disclosure, which includes: a power supply, a hot plugging module and the hot plugging module power supply device according to any one of the above embodiments. The hot plugging module power supply device is connected to the power supply and the hot plugging module. The power supply is configured to transmit a current to the hot plugging module power supply device. The hot plugging module is configured to receive the current outputted by the hot plugging module power supply device.

In an embodiment of the present disclosure, the hot plugging module includes any one or more of the following: a mainboard, a server power supply, a hard disk, a memory bank, a server node, a video card, a network card and a sound card.

Advantageous Effect of the Disclosure

Advantageous Effect

A hot plugging module power supply device, a hot plugging module power supply method and a hot plugging module power supply system are provided according to the embodiments of the present disclosure. In a case where a hot plugging module is connected to a system in a hot plugging manner, a control unit transmits a first control signal to a signal processing unit. The signal processing unit forms a switch-on signal based on the first control signal and transmits the switch-on signal to a switch unit, to gradually switch on a current input terminal and a current output terminal of the switch unit, to provide power to the hot plugging module. During the hot plugging module is supplied with power, in a case where an overcurrent fault occurs in the hot plugging module, the control unit transmits a second control signal to the signal processing unit, and the signal processing unit forms a switch-off signal based on the second control signal and transmits the switch-off signal to the switch unit, to immediately switch off the current input terminal and the current output terminal of the switch unit, to stop supplying power to the hot plugging module. It can be seen that, with the cooperation of the control unit and the signal processing unit, in a case where the hot plugging module is connected to the system, the current input terminal and the current output terminal of the switch unit are gradually switched on, to supply power to the hot plugging module, thereby preventing a large surge current from being generated in the hot plugging module. In a process of supplying power to the hot plugging module, in a case where the overcurrent fault occurs in the hot plugging module, the current input terminal and the current output terminal of the switch unit are immediately switched off, to stop supplying power to the hot plugging module, thereby preventing the hot plugging module and the power supply from being damaged. Therefore, with the hot plugging module power supply device according to the embodiments of the present disclosure, the security of the power supply to the hot plugging module can be improved.

BRIEF DESCRIPTION OF THE DRAWINGS

Description of the Drawings

In order to more clearly illustrate technical solutions according to the present disclosure or the conventional technology, the drawings to be used in the description of the embodiments or the conventional technology are described briefly hereinafter. It is apparent that the drawings in the following description only illustrate some embodiments of the present disclosure. For those skilled in the art, other drawings may be obtained according to these drawings without any creative work.

Figure 1:
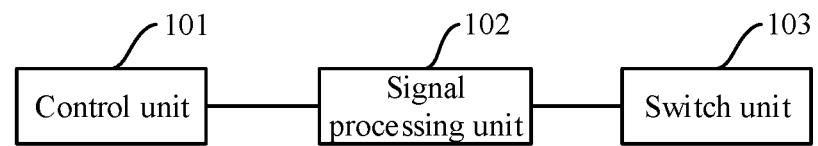
Figure 2:
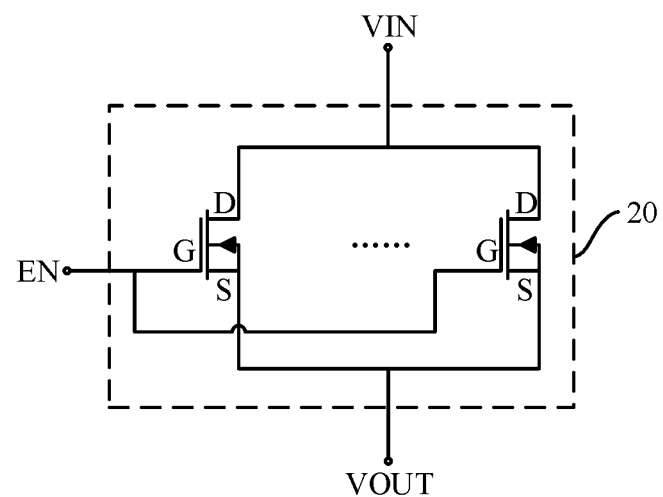
Figure 3:
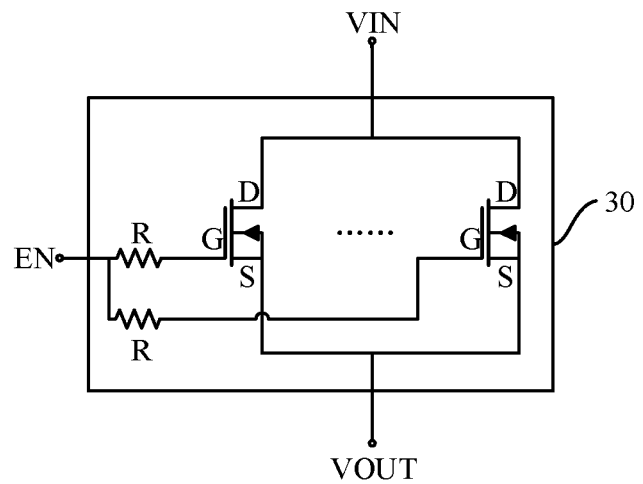
Figure 4:
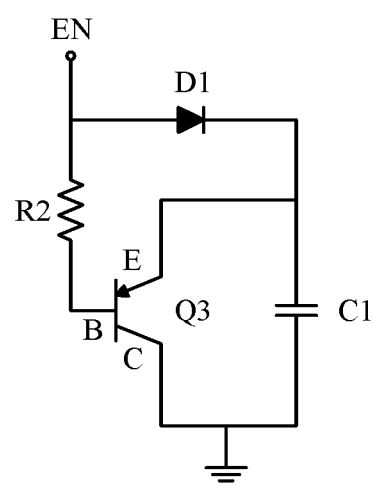
Figure 5:
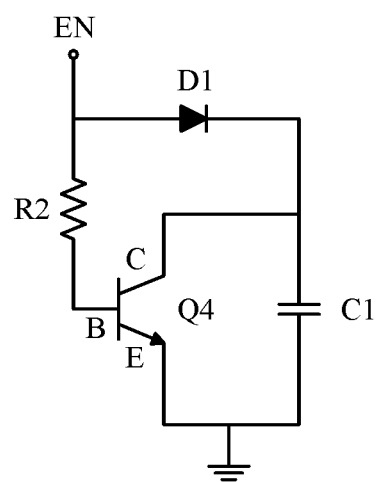
Figure 6:
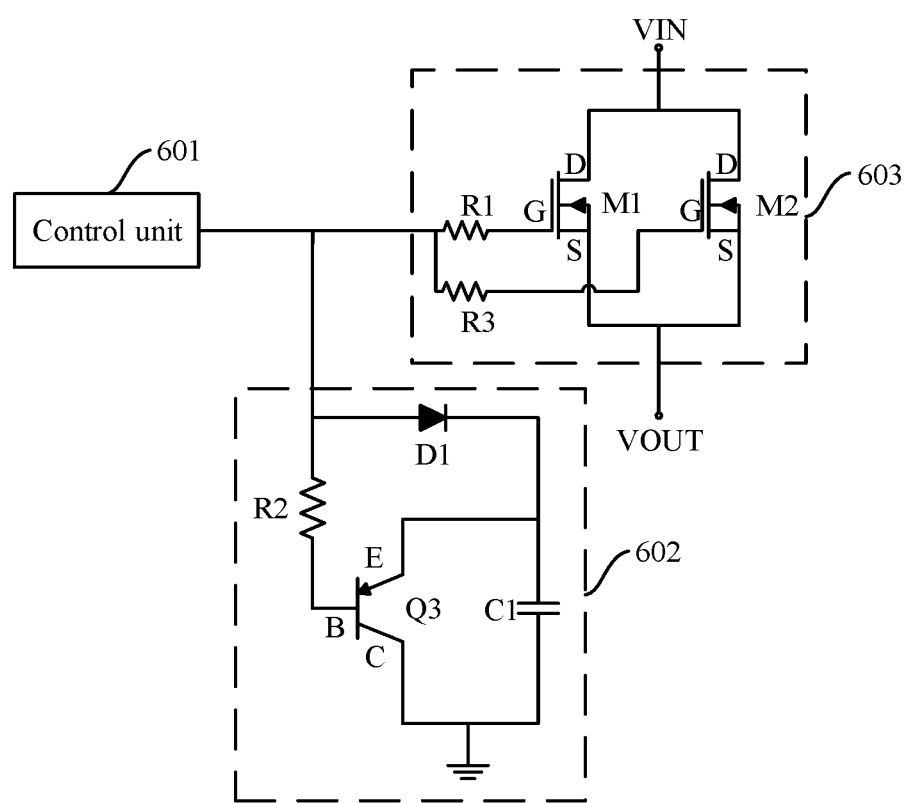
Figure 7:
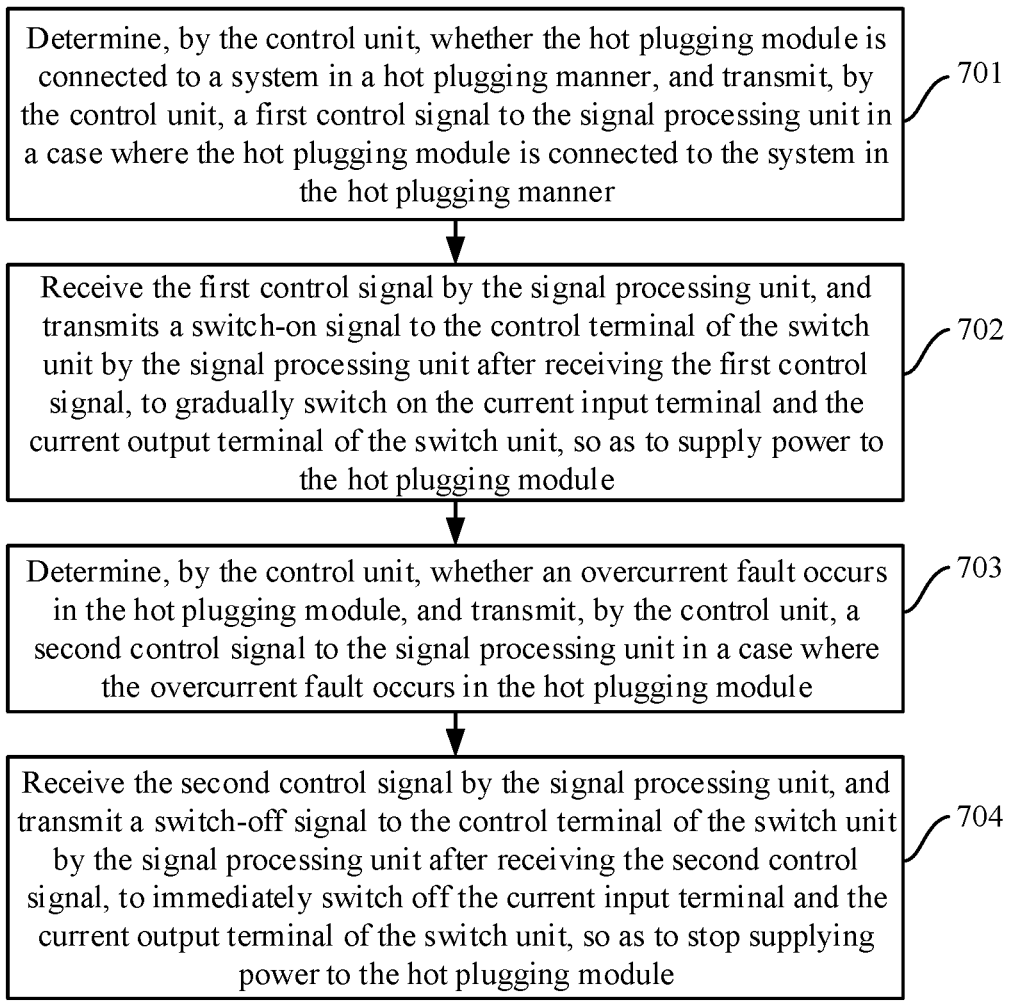
Figure 8:
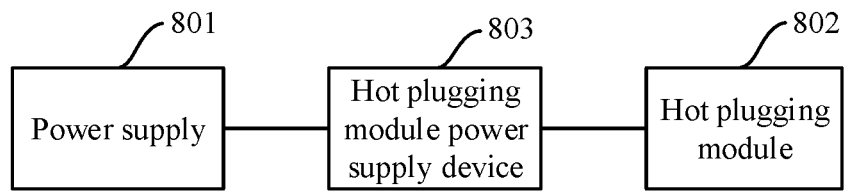
Figure 9:
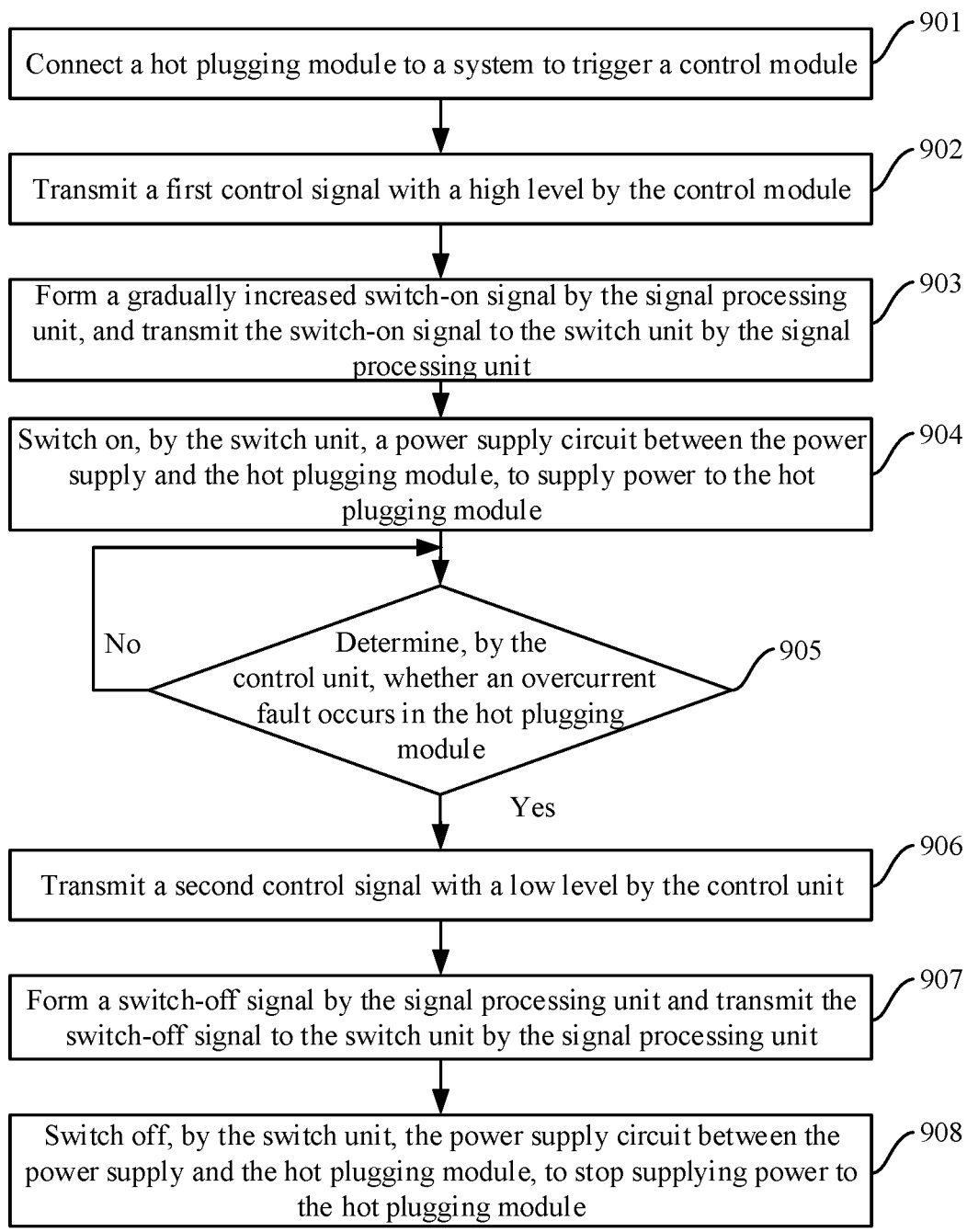

FIG. 1 is a schematic diagram of a hot plugging module power supply device according to an embodiment of the present disclosure;

FIG. 2 is a schematic diagram of a switch unit according to an embodiment of the present disclosure;

FIG. 3 is a schematic diagram of a switch unit according to another embodiment of the present disclosure;

FIG. 4 is a schematic diagram of a signal processing unit according to an embodiment of the present disclosure;

FIG. 5 is a schematic diagram of a signal processing unit according to another embodiment of the present disclosure;

FIG. 6 is a schematic diagram of a hot plugging module power supply device according to another embodiment of the present disclosure;

FIG. 7 is a flowchart of a hot plugging module power supply method according to an embodiment of the present disclosure;

FIG. 8 is a schematic diagram of a hot plugging module power supply system according to an embodiment of the present disclosure; and FIG. 9 is a flowchart of a hot plugging module power supply method according to another embodiment of the present disclosure.

EMBODIMENTS OF THE DISCLOSURE

Embodiments of the Present Disclosure

For making the objects, technical solutions and advantages of the embodiments of the present disclosure more clear, the technical solutions in the embodiments of the present disclosure are described clearly and completely hereinafter in conjunction with the drawings in the embodiments of the present disclosure. The described embodiments are some, rather than all of the embodiments of the present disclosure. Based on the embodiments of the present disclosure, all other embodiments, made by those skilled in the art without any creative efforts, should fall into the protection scope of the present disclosure.

As shown in FIG. 1, a hot plugging module power supply device is provided according to an embodiment of the present disclosure, which may include: a control unit 101, a signal processing unit 102 and a switch unit 103.

The switch unit 103 is provided with a current input terminal, a current output terminal and a control terminal. The current input terminal is connected to an external power supply. The current output terminal is connected to an external hot plugging module. The control terminal is connected to the signal processing unit 102.

The control unit 101 is configured to transmit a first control signal to the signal processing unit 102 in a case where the hot plugging module is connected to a system in a hot plugging manner; and transmit a second control signal to the signal processing unit 102 in a case where an overcurrent fault occurs in the hot plugging module.

The signal processing unit 102 is configured to transmit, after receiving the first control signal transmitted by the control unit 101, a switch-on signal to the control terminal of the switch unit 103, to gradually switch on the current input terminal and the current output terminal of the switch unit; and transmit, after receiving the second control signal transmitted by the control unit 101, a switch-off signal to the control terminal of the switch unit 103, to immediately switch off the current input terminal and the current output terminal of the switch unit 103.

The hot plugging module power supply device is provided according to the embodiment of the present disclosure. In a case where the hot plugging module is connected to a system in a hot plugging manner, the control unit transmits the first control signal to the signal processing unit. The signal processing unit forms the switch-on signal based on the first control signal and transmits the switch-on signal to the switch unit, to gradually switch on the current input terminal and the current output terminal of the switch unit, to provide power to the hot plugging module. During the hot plugging module is supplied with power, in a case where an overcurrent fault occurs in the hot plugging module, the control unit transmits the second control signal to the signal processing unit, and the signal processing unit forms the switch-off signal based on the second control signal and transmits the switch-off signal to the switch unit, to immediately switch off the current input terminal and the current output terminal of the switch unit, to stop supplying power to the hot plugging module. It can be seen that, with the cooperation of the control unit and the signal processing unit, in a case where the hot plugging module is connected to the system, the current input terminal and the current output terminal of the switch unit are gradually switched on, to supply power to the hot plugging module, thereby preventing a large surge current from being generated in the hot plugging module. In a process of supplying power to the hot plugging module, in a case where the overcurrent fault occurs in the hot plugging module, the current input terminal and the current output terminal of the switch unit are immediately switched off, to stop supplying power to the hot plugging module, thereby preventing the hot plugging module and the power supply from being damaged. Therefore, with the hot plugging module power supply device according to the embodiments of the present disclosure, the security of the power supply to the hot plugging module can be improved.

In an embodiment of the present disclosure, as shown in FIG. 2, a switch unit 20 includes at least one NMOS transistor. A drain D of each of the at least one NMOS transistor is connected to a power supply output terminal VIN, a source S of each of the at least one NMOS transistor is connected to a power supply input terminal VOUT of a hot plugging module, and a gate G of each of the at least one NMOS transistor is connected to a signal transmitting terminal EN of the signal processing unit. Each of the at least one NMOS transistor is configured to be gradually switched on after receiving the switch-on signal transmitted by the signal processing unit via the signal transmitting terminal EN; and be immediately switched off after receiving the switch-off signal transmitted by the signal processing unit via the signal transmitting terminal EN.

Specifically, in a case where the gate of the NMOS transistor receives the switch-on signal transmitted by the signal processing unit, the drain and the source of the NMOS transistor are gradually switched on. In a process of the drain and the source of the NMOS transistor being gradually switched on, a current transmitted by the power supply to the hot plugging module through the NMOS transistor is gradually increased, thereby decreasing a surge current generated when the hot plugging module is connected to a system in the hot plugging manner. In a case where the gate of the NMOS transistor receives the switch-off signal transmitted by the signal processing unit, the drain and the source of the NMOS transistor are immediately switched off, to eliminate an overcurrent fault occurring in the hot plugging module, so as to protect the hot plugging module and the power supply.

In addition, multiple NMOS transistors are connected in parallel between the power supply and the hot plugging module, the gate of each of the NMOS transistors is connected to the signal processing unit, and the signal processing unit transmits the switch-on signal to the gate of each of the NMOS transistors simultaneously. In this case, since the NMOS transistors are connected in parallel, even if one of the NMOS transistors is not switched on due to a fault, the other NMOS transistors may still be switched on to supply power to the hot plugging module, thereby improving the reliability of the power supply to the hot plugging module. On the other hand, since the NMOS transistors are connected in parallel, in a case where the power supply transmits the current to the hot plugging module, each of the NMOS transistors carries a part of the current, thereby achieving the power supply to the hot plugging module with a high power consumption, thus improving the applicability of the hot plugging module power supply device according to the embodiment of the present disclosure.

In an embodiment of the present disclosure, as shown in FIG. 3, a switch unit 30 may further include: at least one first resistor R, and the at least one first resistor R is in one-to-one correspondence with the at least one NMOS transistor. A first terminal of each of the at least one first resistor is connected to the gate G of the NMOS transistor corresponding to the first resistor, and a second terminal of each of the at least one first resistor is connected to the signal transmitting terminal EN of the signal processing unit.

Specifically, for each of the NMOS transistors, one first resistor R is connected in series between the gate G and the signal processing unit, and a voltage at the gate G of the NMOS transistor may be changed by adjusting a resistance value of the first resistor R, to adjust a switch-on/off voltage of the NMOS transistor, so as to adapt to different hot plugging modules, thereby improving the applicability of the hot plugging module power supply device according to the embodiment of the present disclosure.

In an embodiment of the present disclosure, as shown in FIG. 4, a signal processing unit 40 includes: a second resistor R2, a capacitor C1, a diode D1 and a transistor Q1. A first terminal of the second resistor R2 is connected to the signal transmitting terminal EN of the signal processing unit 40, the signal transmitting terminal EN is connected to the control unit and a second terminal of each of the first resistors of the switch unit, and a second terminal of the second resistor R2 is connected to a base B of the transistor Q3. A collector C and an emitter E of the transistor Q3 are respectively connected to two terminals of the capacitor C1. The two terminals of the capacitor C1 are respectively connected to a negative electrode of the diode D1 and a ground wire. A positive electrode of the diode D1 is connected to the first terminal of the second resistor R2. The transistor Q3 is configured to be switched off after receiving the first control signal with a high level transmitted by the control unit, to charge the capacitor C1, so as to form a switch-on signal gradually increased from zero to the first control signal, and transmit the formed switch-on signal to the gate G of each of the NMOS transistors via the signal transmitting terminal EN and the each of the first resistors; and be switched on after receiving the second control signal with a low level transmitted by the control unit, to discharge the capacitor C1, so as to directly transmit, through each of the first resistors, the second control signal to the gate of the NMOS transistor corresponding to the first resistor as the switch-off signal.

Specifically, as shown in FIG. 4, taking a case where the transistor Q3 is a PNP transistor as an example, in a case where the control unit transmits the first control signal with a high level, the diode D1 is forward switched on. Since no current passes through the base B of the transistor Q3, electric potentials at the base B and the emitter E of the transistor Q3 are equal to each other, such that the transistor Q3 is in a switch-off state and the capacitor C1 is charged. A portion of the voltage may be consumed due to the charge to the capacitor C1, as the charging process proceeds, the consumed voltage is gradually decreased, and no voltage is consumed after the charge to the capacitor C1 is finished. Under an action of the charge to the capacitor C1, a voltage at the signal transmitting terminal EN is gradually increased from zero. After the charge to the capacitor C1 is finished and no voltage is consumed, the voltage at the signal transmitting terminal EN is the same as the first control signal, thereby forming a switch-on signal gradually increased from zero to the first control signal. Since the signal transmitting terminal EN is connected to the gate G of each of the NMOS transistors through the first resistor corresponding to the NMOS transistor, in a case where the gradually increased switch-on signal is transmitted to the gate G of each of the NMOS transistors, each of the NMOS transistors is gradually switched on until the NMOS transistor is fully switched on. Therefore, the current transmitted to the hot plugging module is increased gradually, such that a pulse current generated by the charge to the capacitor when the hot plugging module is connected to the system is decreased.

As shown in FIG. 4, taking a case where the transistor Q3 is a PNP transistor as an example, in a case where the control unit transmits the second control signal with a low level, since the capacitor C1 stores charges, a terminal of the capacitor C1 connected to the emitter E of the transistor Q3 is at a high level, and the signal transmitting terminal EN is at a low level, such that the diode D1 is switched off. Since the base B of the transistor Q3 is connected to the signal transmitting terminal EN, the base B of the transistor Q3 is also at a low level, such that the transistor Q3 is switched on. The capacitor C1 and the emitter E and the collector C of the transistor Q3 form a loop, and the charges stored in the capacitor C1 are consumed in the loop. Therefore, in a case where the control unit transmits the second control signal with a low level, the level at the signal transmitting terminal EN is immediately pulled down to the low level, and accordingly, the level at the gate G of each of the NMOS transistors is also pulled down to the low level, such that each of the NMOS transistors is immediately switched off, thereby timely stopping supplying power to the hot plugging device.

In an embodiment of the present disclosure, the transistor included in the signal processing unit may be a PNP transistor or a NPN transistor.

In a case where the transistor is the PNP transistor, as shown in FIG. 4, an emitter E of a transistor Q3 is connected to a first terminal of a capacitor C1, a collector C of the transistor Q3 is connected to a second terminal of the capacitor C1. The first terminal of the capacitor C1 is connected to a negative electrode of a diode D1, and the second terminal of the capacitor C1 is grounded.

In a case where the transistor is the NPN transistor, as shown in FIG. 5, a collector C of a transistor Q4 is connected to the first terminal of the capacitor C1, and an emitter E of the transistor Q4 is connected to the second terminal of the capacitor C1. The first terminal of the capacitor C1 is connected to the negative electrode of the diode D1, and the second terminal of the capacitor C1 is grounded.

No matter the transistor is the NPN transistor or the PNP transistor, the transistor is switched off after receiving the first control signal transmitted by the control unit, to charge the capacitor, so as to form the gradually increased switch-on signal. The transistor is switched on after receiving the second control signal transmitted by the control unit, to discharge the capacitor within the signal processing unit without affecting the second control signal transmitted by the control unit, such that each of the NMOS transistors is switched off due to the second control signal with a low level. Therefore, the function of the signal processing unit may be achieved by either the NPN transistor or the PNP transistor. In an actual service implementation process, the transistor may be determined flexibly according to actual needs, thereby further improving the applicability of the hot plugging module power supply device according to the embodiment of the present disclosure.

Hereinafter, the hot plugging module power supply device according to the embodiment of the present disclosure is further described by taking the case where the transistor is the PNP transistor as an example. As shown in FIG. 6, the hot plugging module power supply device includes: a control unit 601, a signal processing unit 602 and a switch unit 603. The signal processing unit 602 includes: a resistor R2, a diode D1, a PNP transistor Q3 and a capacitor C1. The switch unit 603 includes: a resistor R1, a resistor R3, a NMOS transistor M1 and a NMOS transistor M2.

In the signal processing unit 602, a first terminal of the resistor R2 is connected to the control unit 601, and a second terminal of the resistor R2 is connected to a base B of the PNP transistor Q3. An emitter E of the PNP transistor Q3 is connected to the first terminal of the capacitor C1, a collector C of the PNP transistor Q3 is connected to the second terminal of the capacitor C1, and the second terminal of the capacitor C1 is grounded. The positive electrode of the diode D1 is connected to the first terminal of the resistor R2, and the negative electrode of the diode D2 is connected to the first terminal of the capacitor C1.

In the switch unit 603, the first terminal of the resistor R1 is connected to the gate G of the NMOS transistor M1, and the second terminal of the resistor R1 is connected to the control unit 601. The drain D of the NMOS transistor M1 is connected to an external power supply VIN, and the source S of the NMOS transistor M1 is connected to an external hot plugging module VOUT. The first terminal of the resistor R3 is connected to the gate G of the NMOS transistor M2, the second terminal of the resistor R3 is connected to the control unit 601. The drain D of the NMOS transistor M2 is connected to the power supply VIN, and the source S of the NMOS transistor M2 is connected to the hot plugging module VOUT.

When the hot plugging module VOUT is connected to a system in a hot plugging manner, the control unit 601 is triggered to output the first control signal with a high level. In a case where the first control signal is transmitted to the signal processing unit 602, the capacitor C1 is charged. A gradually increased switch-on signal is formed by the signal processing unit 602 during a charging process. The switch-on signal is transmitted to the gates of the NMOS transistor M1 and the NMOS transistor M2, such that the NMOS transistor M1 and the NMOS transistor M2 are gradually switched on, thereby achieving the power supply to the hot plugging module VOUT.

In a case where an overcurrent fault occurs in the hot plugging module VOUT, the control unit 601 is triggered to output the second control signal with a low level. In a case where the second control signal is transmitted to the signal processing unit 602, the capacitor C1 is discharged. The second control signal with a low level is not affected during the discharge of the capacitor C1 in the signal processing unit 602, such that the NMOS transistor M1 and the NMOS transistor M2 are immediately switched off in a case where the second control signal with a low level is transmitted to the gates of the NMOS transistor M1 and the NMOS transistor M2, thereby stopping supplying power to the hot plugging module VOUT.

As shown in FIG. 7, a hot plugging module power supply method based on the hot plugging module power supply device according to any one of the above embodiments of the present disclosure is provided according to an embodiment of the present disclosure, which may include following steps 701 to 704.

In step 701, the control unit determines whether the hot plugging module is connected to a system in a hot plugging manner, and transmits a first control signal to the signal processing unit in a case where the hot plugging module is connected to the system in the hot plugging manner.

In step 702, the signal processing unit receives the first control signal, and transmits a switch-on signal to the control terminal of the switch unit after receiving the first control signal, to gradually switch on the current input terminal and the current output terminal of the switch unit, so as to supply power to the hot plugging module.

In step 703, the control unit determines whether an overcurrent fault occurs in the hot plugging module, and transmits a second control signal to the signal processing unit in a case where the overcurrent fault occurs in the hot plugging module.

In step 704, the signal processing unit receives the second control signal, and transmits a switch-off signal to the control terminal of the switch unit after receiving the second control signal, to immediately switch off the current input terminal and the current output terminal of the switch unit, so as to stop supplying power to the hot plugging module.

In an embodiment of the present disclosure, in a case where the switch unit includes at least one NMOS transistor, the gradually switching on the current input terminal and the current output terminal of the switch unit in step 702 includes: gradually switching on each of the at least one NMOS transistor, the immediately switching off the current input terminal and the current output terminal of the switch unit in step 704 includes: immediately switching off each of the at least one NMOS transistor.

In an embodiment of the present disclosure, in a case where the switch unit includes at least one first resistor, and the signal processing unit includes a second resistor, a capacitor, a diode and a transistor, the receiving the first control signal by the signal processing unit and transmitting the switch-on signal to the control terminal of the switch unit by the signal processing unit after receiving the first control signal in step 702 includes: receiving the first control signal with a high level by the transistor, where the transistor is switched off after receiving the first control signal, to charge the capacitor, so as to form a switch-on signal gradually increased from zero to the first control signal; and transmitting, by the transistor, the formed switch-on signal to the gate of each of the at least one NMOS transistor. The receiving the second control signal by the signal processing unit, and transmitting the switch-off signal to the control terminal of the switch unit by the signal processing unit after receiving the second control signal in step 704 includes: receiving the second control signal with a low level by the transistor, where the transistor is switched off after receiving the second control signal, to discharge the capacitor, so as to directly transmit the second control signal to the gate of each of the at least one NMOS transistor as the switch-off signal.

It is to be noted that since steps included in the method embodiment are based on the same conception as the above device embodiment, for detailed content, reference may be made to the description in the above device embodiments, which is not described here.

As shown in FIG. 8, a hot plugging module power supply system is further provided according to an embodiment of the present disclosure, which includes: a power supply 801, a hot plugging module 802 and a hot plugging module power supply device 803 according to any one of the embodiments of the present disclosure. The hot plugging module power supply device 803 is connected to the power supply 801 and the hot plugging module 802. The power supply 801 is configured to transmit a current to the hot plugging module power supply device 803. The hot plugging module 802 is configured to receive the current outputted by the hot plugging module power supply device 803.

In an embodiment of the present disclosure, the hot plugging module includes any one or more of the following: a mainboard, a server power supply, a hard disk, a memory bank, a server node, a video card, a network card and a sound card. Since the hot plugging module may be any one or more of a mainboard, a server power supply, a hard disk, a memory bank, a server node, a video card, a network card and a sound card, the hot plugging module power supply device according to the embodiments of the present disclosure is applicable to various hot plugging modules such as a hot plugging hard disk, a hot plugging mainboard, thereby improving the applicability of the hot plugging module power supply device, the hot plugging module power supply method and the hot plugging module power supply system according to the embodiments of the present disclosure.

It is to be noted that the hot plugging module power supply device according to the embodiment of the present disclosure may exist as a separate device, or may be integrated in a hot plugging module, which may be determined flexibly according to actual needs in a specific service implementation process.

The hot plugging module power supply method according to the embodiment of the present disclosure is further described in detail in conjunction with the hot plugging module power supply device shown in FIG. 6 and the hot plugging module power supply system shown in FIG. 8. As shown in FIG. 9, the method may include following steps 901 to 908.

In step 901, a hot plugging module is connected to a system to trigger a control module.

In an embodiment of the present disclosure, in a case where the hot plugging module having the hot plugging function is connected to the system in the hot plugging manner, a trigger signal is formed and transmitted to the control module.

For example, it is assumed that a blade server includes six server nodes, that is, a server node 1 to a server node 6, and the server node 6 has a fault and is removed for maintaining, when the server node 6 is connected to the blade server in the hot plugging manner after the server node 6 is maintained, a trigger signal may be transmitted to the control unit of the hot plugging module power supply device corresponding to the server node 6 to trigger the control unit.

In step 902, the control module transmits a first control signal with a high level.

In an embodiment of the present disclosure, the control module determines that the hot plugging module is connected to the system in the hot plugging manner after being triggered, generates the first control signal with a high level and transmits the first control signal with a high level to the signal processing unit.

For example, as shown in FIG. 6, the control unit 601 forms a first control signal of 20V after being triggered and continuously transmits the first control signal of 20V to the signal processing unit 602.

In step 903, the signal processing unit forms a gradually increased switch-on signal, and transmits the switch-on signal to the switch unit.

In an embodiment of the present disclosure, the signal processing unit receives the first control signal transmitted by the control unit, and forms a gradually increased switch-on signal based on the first control signal. The switch-on signal is increased gradually from zero until the switch-on signal is the same as the first control signal. The signal processing unit transmits the formed switch-on signal to the switch unit in real time.

For example, as shown in FIG. 6, after the signal processing unit 602 receives the first control signal of 20V transmitted by the control unit 601, the transistor Q3 is in a switch-off state, and the capacitor C1 is charged. A portion of the voltage may be consumed due to the charge to the capacitor C1, such that a switch-on signal gradually increased from 0 to 20V is formed, and the formed switch-on signal is transmitted to each of the NMOS transistors in the switch unit 603 in real time.

In step 904, the switch unit switches on a power supply circuit between a power supply and the hot plugging module, to supply power to the hot plugging module.

In an embodiment of the present disclosure, the switch unit gradually switches on the power supply circuit between the power supply and the hot plugging module after receiving the gradually increased first control signal transmitted by the signal processing unit, to gradually increase a current inputted to the hot plugging module until the power supply circuit between the power supply and the hot plugging module is fully switched on, and the hot plugging module is supplied with power with a stable current.

For example, as shown in FIG. 6, after gates of the MOS transistor M1 and the NMOS transistor M2 receive the gradually increased switch-on signal, the drain D and the source S of each of the MOS transistor M1 and the NMOS transistor M2 are gradually switched on. The current transmitted by the switch unit 603 to the hot plugging module VOUT (the server node 6) is gradually increased, until the drain D and the source S are fully switched on, and the switch unit 603 transmits the stable current to the hot plugging module VOUT (the server node 6).

In step 905, the control unit determines whether an overcurrent fault occurs in the hot plugging module, and performs step 906 in a case where the overcurrent fault occurs in the hot plugging module, or performs step 905 in a case where no overcurrent fault occurs in the hot plugging module.

In an embodiment of the present disclosure, in a case where the switch unit outputs the stable current to the hot plugging module, the control unit determines whether the overcurrent fault occurs in the hot plugging module in real time, and performs step 906 in a case where the overcurrent fault occurs in the hot plugging module, or performs step 905 to continually monitor the hot plugging module in a case where no overcurrent fault occurs in the hot plugging module.

In step 906, the control unit transmits a second control signal with a low level.

In an embodiment of the present disclosure, after determining that an overcurrent fault or a short circuit fault occurs in the hot plugging module, the control unit forms the second control signal with a low level and transmits the second control signal with a low level to the signal processing unit.

For example, as shown in FIG. 6, in a case where the control unit 601 determines that the overcurrent fault occurs in the hot plugging module VOUT (the server node 6), the control unit 601 forms a second control signal of 0V. That is, the transmission of a voltage to the signal processing unit 602 is stopped.

In step 907, the signal processing unit forms a switch-off signal and transmits the switch-off signal to the switch unit.

In an embodiment of the present disclosure, after receiving the second control signal transmitted by the control unit, the signal processing unit forms a switch-off signal with a low level and transmits the formed switch-off signal with a low level to the switch unit.

For example, as shown in FIG. 6, in a case where no voltage is outputted from the control unit 601, the transistor Q3 in the signal processing unit 602 is switched on, and the capacitor C is discharged. However, the signal with a low level outputted by the control unit 601 is not affected during the discharging process, such that the second control signal with a low level outputted by the control unit 601 is directly transmitted to the switch unit 603 as the switch-off signal.

In step 908, the switch unit switches off the power supply circuit between the power supply and the hot plugging module, to stop supplying power to the hot plugging module.

In an embodiment of the present disclosure, the switch unit immediately switches off the power supply circuit between the power supply and the hot plugging module after receiving the switch-off signal transmitted by the signal processing unit, to stop supplying power to the hot plugging module.

For example, as shown in FIG. 6, in a case where no voltage is outputted from the control unit 601, a level at the gate G of each of the MOS transistor M1 and the NMOS transistor M2 is pulled down immediately, such that the MOS transistor M1 and the NMOS transistor M2 are immediately switched off, to switch off the power supply circuit between the power supply VIN and the hot plugging module VOUT (the server node 6) immediately, thereby timely stopping supplying power to the hot plugging module VOUT (the server node 6).

With the hot plugging module power supply device, the hot plugging module power supply method and the hot plugging module power supply system according to the embodiments of the present disclosure, at least the following beneficial effects can be achieved.

1. In the hot plugging module power supply device, the hot plugging module power supply method and the hot plugging module power supply system according to the embodiments of the present disclosure, in a case where the hot plugging module is connected to a system in a hot plugging manner, the control unit transmits the first control signal to the signal processing unit. The signal processing unit forms the switch-on signal based on the first control signal and transmits the switch-on signal to the switch unit, to gradually switch on the current input terminal and the current output terminal of the switch unit, so as to provide power to the hot plugging module. During the hot plugging module is supplied with power, in a case where an overcurrent fault occurs in the hot plugging module, the control unit transmits the second control signal to the signal processing unit, and the signal processing unit forms the switch-off signal based on the second control signal and transmits the switch-off signal to the switch unit, to immediately switch off the current input terminal and the current output terminal of the switch unit, so as to stop supplying power to the hot plugging module. It can be seen that, with the cooperation of the control unit and the signal processing unit, in a case where the hot plugging module is connected to the system, the current input terminal and the current output terminal of the switch unit are gradually switched on, to supply power to the hot plugging module, thereby preventing a large surge current from being generated in the hot plugging module. In a process of supplying power to the hot plugging module, in a case where the overcurrent fault occurs in the hot plugging module, the current input terminal and the current output terminal of the switch unit are immediately switched off, to stop supplying power to the hot plugging module, thereby preventing the hot plugging module and the power supply from being damaged. Therefore, with the hot plugging module power supply device according to the embodiments of the present disclosure, the security of the power supply to the hot plugging module can be improved.

2. In the hot plugging module power supply device, the hot plugging module power supply method and the hot plugging module power supply system according to the embodiments of the present disclosure, multiple NMOS transistors are connected in parallel to form the switch unit, the gate of each of the NMOS transistors is connected to the signal processing unit, and the signal processing unit transmits the switch-on signal to the gate of each of the NMOS transistors simultaneously. In this case, since the NMOS transistors are connected in parallel, even if one of the NMOS transistors is not switched on due to a fault, the other NMOS transistors may still be switched on to supply power to the hot plugging module, thereby improving the reliability of the power supply to the hot plugging module.

3. In the hot plugging module power supply device, the hot plugging module power supply method and the hot plugging module power supply system according to the embodiments of the present disclosure, since the NMOS transistors in the switch unit are connected in parallel, in a case where the power supply transmits the current to the hot plugging module, each of the NMOS transistors carries a part of the current, thereby achieving the power supply to the hot plugging module with a high power consumption, thus improving the applicability of the hot plugging module power supply device according to the embodiment of the present disclosure.

4. In the hot plugging module power supply device, the hot plugging module power supply method and the hot plugging module power supply system according to the embodiments of the present disclosure, the transistor in the signal processing unit may be a NPN transistor or a PNP transistor. In an actual service implementation process, the transistor may be determined flexibly according to actual needs, thereby further improving the applicability of the hot plugging module power supply device according to the embodiment of the present disclosure.

It is to be noted that the relationship terminologies such as "first", "second" and the like are only used herein to distinguish one entity or operation from another, rather than to necessitate or imply that the actual relationship or order exists between the entities or operations. Moreover, terms "comprising", "including", or any other variant thereof are intended to encompass a non-exclusive inclusion such that processes, methods, articles, or devices that include a series of elements include not only those elements but also those that are not explicitly listed or other elements that are inherent to such processes, methods, articles, or devices. Without limiting more, the elements defined by the statement "comprising one . . . " do not exclude that there are other identical factors in the process, method, article, or device that includes said elements.

It is to be understood by those skilled in the art that all or some of the steps for implementing the embodiments of the method described above may be achieved by means of hardware instructed by program instructions. The aforementioned program may be stored in a computer-readable storage medium, and when the program is executed, the steps including the embodiments of the method described above are executed. The above storage medium includes various medium that may store program codes, such as a ROM, a RAM, a magnetic disk or an optical disk.

It should be noted that the above description only shows preferred embodiments of the present disclosure, which is only for explaining the technical solutions of the present disclosure and is not intended to limit the protection scope of the present disclosure. Any modifications, equivalent substitutions, improvements and the like made within the spirit and the principle of the present disclosure are intended to be included within the protection scope of the present disclosure.

The invention claimed is:

1. A hot plugging module power supply device, comprising: a control unit, a signal processing unit and a switch unit, wherein
the switch unit is provided with a current input terminal, a current output terminal and a control terminal, the current input terminal is connected to an external power supply, the current output terminal is connected to an external hot plugging module, and the control terminal is connected to the signal processing unit,
the control unit is configured to transmit a first control signal to the signal processing unit in a case where the hot plugging module is connected to a system in a hot plugging manner; and transmit a second control signal to the signal processing unit in a case where an overcurrent fault occurs in the hot plugging module, and
the signal processing unit comprises a second resistor, a capacitor, a diode and a transistor and is configured to transmit, after receiving the first control signal transmitted by the control unit, a switch-on signal to the control terminal of the switch unit, to gradually switch on the current input terminal and the current output terminal of the switch unit; and transmit, after receiving the second control signal transmitted by the control unit, a switch-off signal to the control terminal of the switch unit, to immediately switch off the current input terminal and the current output terminal of the switch unit.

2. The device according to claim 1, wherein
the switch unit comprises at least one NMOS transistor, and wherein
a drain of each of the at least one NMOS transistor is connected to the power supply, a source of each of the at least one NMOS transistor is connected to the hot plugging module, and a gate of each of the at least one NMOS transistor is connected to the signal processing unit; and
each of the at least one NMOS transistor is configured to be gradually switched on after receiving the switch-on signal and be immediately switched off after receiving the switch-off signal.

3. The device according to claim 2, wherein
the switch unit further comprises at least one first resistor, and wherein
the at least one first resistor is in one-to-one correspondence with the at least one NMOS transistor;
a first terminal of each of the at least one first resistor is connected to a gate of a NMOS transistor corresponding to the first resistor; and
a second terminal of each of the at least one first resistor is connected to the signal processing unit.

4. The device according to claim 3, wherein
a first terminal of the second resistor is connected to the control unit and the second terminal of each of the at least one first resistor, and a second terminal of the second resistor is connected to a base of the transistor; a collector and an emitter of the transistor are respectively connected to two terminals of the capacitor; the two terminals of the capacitor are respectively connected to a negative electrode of the diode and a ground wire; a positive electrode of the diode is connected to the first terminal of the second resistor, and
the transistor is configured to be switched off after receiving the first control signal with a high level, to charge the capacitor, to form a switch-on signal gradually increased from zero to the first control signal, and transmit the formed switch-on signal to the gate of each of the at least one NMOS transistor; and be switched on after receiving the second control signal with a low level, to discharge the capacitor, to directly transmit the second control signal to the gate of each of the at least one NMOS transistor as the switch-off signal.

5. The device according to claim 4, wherein
the transistor is a PNP transistor, an emitter of the PNP transistor is connected to a first terminal of the capacitor, a collector of the PNP transistor is connected to a second terminal of the capacitor, the first terminal of the capacitor is connected to the negative electrode of the diode, and the second terminal of the capacitor is grounded.

6. A hot plugging module power supply method based on a hot plugging module power supply device, comprising:
determining, by a control unit of the hot plugging module power supply device, whether a hot plugging module is connected to a system in a hot plugging manner, and transmitting, by the control unit, a first control signal to a signal processing unit of the hot plugging module power supply device in a case where the hot plugging module is connected to the system in the hot plugging manner;

receiving a first control signal by the signal processing unit, and transmitting a switch-on signal to a control terminal of a switch unit of the hot plugging module power supply device by the signal processing unit after receiving the first control signal, to gradually switch on a current input terminal and a current output terminal of the switch unit, to supply power to the hot plugging module;

determining, by the control unit, whether an overcurrent fault occurs in the hot plugging module, and transmitting, by the control unit, a second control signal to the signal processing unit in a case where the overcurrent fault occurs in the hot plugging module; and receiving the second control signal by the signal processing unit, and transmitting a switch-off signal to the control terminal of the switch unit by the signal processing unit after receiving the second control signal, to immediately switch off the current input terminal and the current output terminal of the switch unit, to stop supplying power to the hot plugging module, wherein the signal processing unit comprises a second resistor, a capacitor, a diode and a transistor.

7. The method according to claim 6, wherein:

in a case where the switch unit comprises at least one NMOS transistor, the gradually switching on the current input terminal and the current output terminal of the switch unit comprises: gradually switching on each of the at least one NMOS transistor, and the immediately switching off the current input terminal and the current output terminal of the switch unit comprises: immediately switching off each of the at least one NMOS transistor.

8. The method according to claim 7, wherein in a case where the switch unit further comprises at least one first resistor, the receiving the first control signal by the signal processing unit and transmitting the switch-on signal to the control terminal of the switch unit by the signal processing unit after receiving the first control signal comprises:

receiving the first control signal with a high level by the transistor, wherein the transistor is switched off after receiving the first control signal, to charge the capacitor, to form a switch-on signal gradually increased from zero to the first control signal; and transmitting, by the transistor, the formed switch-on signal to the gate of each of the at least one NMOS transistor, the receiving the second control signal by the signal processing unit, and transmitting the switch-off signal to the control terminal of the switch unit by the signal processing unit after receiving the second control signal comprises:

receiving the second control signal with a low level by the transistor, wherein the transistor is switched on after receiving the second control signal, to discharge the capacitor, to directly transmit the second control signal to the gate of each of the at least one NMOS transistor as the switch-off signal.

9. A hot plugging module power supply system, comprising: a power supply, a hot plugging module and a hot plugging module power supply device, wherein the hot plugging module power supply device comprises:

a control unit, a signal processing unit and a switch unit, wherein the switch unit is provided with a current input terminal, a current output terminal and a control terminal, the current input terminal is connected to the power supply, the current output terminal is connected to the hot plugging module, and the control terminal is connected to the signal processing unit, the control unit is configured to transmit a first control signal to the signal processing unit in a case where the hot plugging module is connected to a system in a hot plugging manner; and transmit a second control signal to the signal processing unit in a case where an overcurrent fault occurs in the hot plugging module, and the signal processing unit comprises a second resistor, a capacitor, a diode and a transistor and is configured to transmit, after receiving the first control signal transmitted by the control unit, a switch-on signal to the control terminal of the switch unit, to gradually switch on the current input terminal and the current output terminal of the switch unit; and transmit, after receiving the second control signal transmitted by the control unit, a switch-off signal to the control terminal of the switch unit, to immediately switch off the current input terminal and the current output terminal of the switch unit, and wherein the hot plugging module power supply device is connected to the power supply and the hot plugging module, the power supply is configured to transmit a current to the hot plugging module power supply device, and the hot plugging module is configured to receive the current outputted by the hot plugging module power supply device.

10. The system according to claim 9, wherein the hot plugging module comprises any one or more of the following: a mainboard, a server power supply, a hard disk, a memory bank, a server node, a video card, a network card and a sound card.

11. The system according to claim 9, wherein the switch unit comprises at least one NMOS transistor, and wherein a drain of each of the at least one NMOS transistor is connected to the power supply, a source of each of the at least one NMOS transistor is connected to the hot plugging module, and a gate of each of the at least one NMOS transistor is connected to the signal processing unit; and each of the at least one NMOS transistor is configured to be gradually switched on after receiving the switch-on signal and be immediately switched off after receiving the switch-off signal.

12. The system according to claim 11, wherein the switch unit further comprises at least one first resistor, and wherein the at least one first resistor is in one-to-one correspondence with the at least one NMOS transistor;

a first terminal of each of the at least one first resistor is connected to a gate of a NMOS transistor corresponding to the first resistor; and a second terminal of each of the at least one first resistor is connected to the signal processing unit.

13. The system according to claim 12, wherein a first terminal of the second resistor is connected to the control unit and the second terminal of each of the at least one first resistor, and a second terminal of the second resistor is connected to a base of the transistor; a collector and an emitter of the transistor are respectively connected to two terminals of the capacitor; the two terminals of the capacitor are respectively connected to a negative electrode of the diode and a ground wire; a positive electrode of the diode is connected to the first terminal of the second resistor, and the transistor is configured to be switched off after receiving the first control signal with a high level, to charge the capacitor, to form a switch-on signal gradually increased from zero to the first control signal, and transmit the formed switch-on signal to the gate of each of the at least one NMOS transistor; and be switched on after receiving the second control signal with a low level, to discharge the capacitor, to directly transmit the second control signal to the gate of each of the at least one NMOS transistor as the switch-off signal.

14. The system according to claim 13, wherein the transistor is a PNP transistor an emitter of the PNP transistor is connected to a first terminal of the capacitor, a collector of the PNP transistor is connected to a second terminal of the capacitor, the first terminal of the capacitor is connected to the negative electrode of the diode, and the second terminal of the capacitor is grounded.

* * * * *